US008967355B2

(12) United States Patent
Pardee et al.

(10) Patent No.: US 8,967,355 B2
(45) Date of Patent: Mar. 3, 2015

(54) ROTATIONAL COUPLING DEVICE CONFIGURED FOR VERTICAL ORIENTATION

(75) Inventors: James A. Pardee, Janesville, WI (US); George P. Gill, Caledonia, IL (US)

(73) Assignee: Warner Electric Technology LLC, Braintree, MA (US)

(*) Notice: Subject to any disclaimer, the term of this patent is extended or adjusted under 35 U.S.C. 154(b) by 301 days.

(21) Appl. No.: 13/594,233

(22) Filed: Aug. 24, 2012

(65) Prior Publication Data

US 2013/0048463 A1 Feb. 28, 2013

Related U.S. Application Data

(60) Provisional application No. 61/527,474, filed on Aug. 25, 2011.

(51) Int. Cl.
| | | |
|---|---|---|
| *F16D 27/115* | (2006.01) |
| *A01D 34/82* | (2006.01) |
| *F16D 55/36* | (2006.01) |
| *F16D 67/02* | (2006.01) |
| *F16D 121/22* | (2012.01) |

(52) U.S. Cl.
CPC .............. *F16D 27/115* (2013.01); *A01D 34/82* (2013.01); *F16D 55/36* (2013.01); *F16D 67/02* (2013.01); *F16D 2300/0214* (2013.01); *F16D 2121/22* (2013.01)
USPC .................................. 192/84.91; 192/84.961

(58) Field of Classification Search
USPC .......... 192/66.3, 66.32, 84.91, 84.96, 84.961, 192/70.11, 109 R, 110 R
See application file for complete search history.

(56) References Cited

U.S. PATENT DOCUMENTS

| 3,724,619 A | * | 4/1973 | Miller | ......................... | 192/84.91 |
| 4,601,371 A | * | 7/1986 | Hendricks | .................. | 192/84.91 |

(Continued)

FOREIGN PATENT DOCUMENTS

| DE | 2638902 B1 | 10/1977 |
| GB | 2468656 A | 9/2010 |

(Continued)

OTHER PUBLICATIONS

International Search Report issued in corresponding International (PCT) Patent Application No. PCT/US2012/052209 (Jan. 9, 2013).

(Continued)

*Primary Examiner* — Jacob S Scott
(74) *Attorney, Agent, or Firm* — Reising Ethington P.C.

(57) ABSTRACT

A rotational coupling device is configured for vertical orientation. The device includes a hub disposed about a rotational axis. A rotor is supported on, and configured for rotation about, the hub and defines a radially extending wall. An armature is supported on the hub for rotation therewith and axially spaced from the wall. Clutch plates are disposed between the rotor wall and armature and rotatably coupled to the rotor or armature. A field shell is disposed on an opposite side of the rotor wall from the armature and houses a conductor. The armature and clutch plates move in a first axial direction towards the rotor wall when the conductor is energized and in a second axial direction when the conductor is subsequently deenergized. At least one of the hub and rotor defines means for limiting movement of a corresponding one of the clutch plates in the second axial direction.

20 Claims, 8 Drawing Sheets

(56) References Cited

U.S. PATENT DOCUMENTS

| | | | |
|---|---|---|---|
| 4,958,712 A * | 9/1990 | Suganuma et al. | 192/84.91 |
| 5,033,595 A | 7/1991 | Pardee | |
| 5,119,918 A | 6/1992 | Pardee | |
| 5,285,882 A | 2/1994 | Pardee | |
| 5,305,865 A | 4/1994 | Larson et al. | |
| 5,549,186 A | 8/1996 | Pardee | |
| 5,971,121 A | 10/1999 | Pardee | |
| 6,364,084 B1 | 4/2002 | Boyer et al. | |
| 7,527,134 B2 | 5/2009 | Pardee | |
| 7,732,959 B2 | 6/2010 | Pardee | |
| 8,020,683 B2 * | 9/2011 | Borys et al. | 192/84.91 |
| 8,123,012 B2 | 2/2012 | Modi | |
| 8,499,916 B2 | 8/2013 | Pardee et al. | |
| 2005/0167225 A1 * | 8/2005 | Sakai et al. | 192/35 |
| 2009/0229941 A1 | 9/2009 | Pardee | |
| 2010/0219036 A1 * | 9/2010 | Uchida et al. | 192/84.91 |

FOREIGN PATENT DOCUMENTS

| | | |
|---|---|---|
| JP | 2007-032833 | 2/2007 |
| WO | 2010-113618 A1 | 10/2010 |

OTHER PUBLICATIONS

Written Opinion issued in corresponding International (PCT) Patent Application No. PCT/US2012/052209 (Jan. 9, 2013).

* cited by examiner

ROTATIONAL COUPLING DEVICE CONFIGURED FOR VERTICAL ORIENTATION

CROSS-REFERENCE TO RELATED APPLICATIONS

This application claims priority to U.S. Provisional Patent Application No. 61/527,474 filed Aug. 25, 2011, the entire disclosure of which is incorporated herein by reference.

BACKGROUND OF THE INVENTION a. Field of the Invention

This invention relates to a rotational coupling device. In particular, the instant invention relates to a device having a variety of improvements intended to permit use of the device in applications requiring either a wet (i.e. including use of a lubricating fluid) or dry coupling device and in applications requiring either vertical or horizontal mounting arrangements.

b. Background Art

Rotational coupling devices such as clutches and brakes are used to control transfer of torque between rotational bodies. In an electromagnetic coupling device, an armature coupled to an input or output member is brought into engagement with, and/or disengagement from, a rotor coupled to the other of the input or output members in order to rotatably couple or decouple the input and output members.

Conventional electromagnetic coupling devices are often ill-suited to use in certain applications including those where a wet coupling device is desired and in applications where the device may need to be oriented vertically. For example, in devices that are oriented vertically, gravitational forces act on the armature and/or clutch plates between the armature and rotor and may cause undesirable movement and frictional engagement of these components at a time when the torque transfer is undesirable. Further, if the device is oriented vertically and a wet device is required, difficulties exist in insuring adequate lubrication of the device components in view of the gravitational forces acting on fluid in the device. It is also difficult to design a wet device in which the electromagnetic circuit provides desired operating characteristics. Use of existing devices in some environments—particularly those in which water or other liquids may be present—can also be problematic because of an inability to adequately remove such liquids and maintain the operability of the device.

The inventors herein have recognized a need for a rotational coupling device that will minimize and/or eliminate one or more of the above-identified deficiencies.

BRIEF SUMMARY OF THE INVENTION

The present invention relates to a rotational coupling device. In particular, the present invention relates to a rotational coupling device having a variety of improvements intended to permit use of the device in applications requiring a vertical mounting arrangement.

A rotational coupling device in accordance with one embodiment of the invention includes a hub configured for coupling to a shaft for rotation with the shaft about an axis of rotation. The device further includes a rotor supported on the hub and configured for rotation relative to the hub about the axis of rotation. The rotor defines a radially extending wall. The device further includes an armature supported on the hub for rotation therewith. The armature is axially spaced from the radially extending wall of the rotor. The device further includes a first clutch plate disposed axially between the radially extending wall of the rotor and the armature. The first clutch plate is coupled to the hub for rotation therewith, but axially movable relative to the hub. The device further includes a second clutch plate disposed axially between the radially extending wall of the rotor and the armature. The second clutch plate is coupled to the rotor for rotation therewith, but axially movable relative to the rotor. The device further includes a field shell disposed about the hub on an opposite side of the radially extending wall of the rotor from the armature. The field shell houses a conductor therein. The armature and the first and second clutch plates are configured for movement in a first axial direction towards the radially extending wall of the rotor upon energization of the conductor to thereby cause frictional engagement of the first and second clutch plates and coupling of the rotor to the hub for rotation therewith. The armature and first and second clutch plates are further configured for movement in a second axial direction opposite the first axial direction upon subsequent deenergization of the conductor. At least one of the hub and the rotor defines a shoulder configured to limit movement of a corresponding one of the first and second clutch plates in the second axial direction. A rotational coupling device in accordance with this embodiment of the invention is advantageous as compared to conventional devices because it permits effective use of the device in a vertical orientation by maintaining separation between the clutch plates when the clutch is disengaged despite gravitational forces acting on the clutch plates.

A rotational coupling device in accordance with another embodiment of the invention includes a hub configured for coupling to a shaft for rotation with the shaft about an axis of rotation. The device further includes a rotor supported on the hub and configured for rotation relative to the hub about the axis of rotation. The rotor defines a radially extending wall. The device further includes an armature supported on the hub for rotation therewith. The armature is axially spaced from the radially extending wall of the rotor. The device further includes a first clutch plate disposed axially between the radially extending wall of the rotor and the armature. The first clutch plate is coupled to the hub for rotation therewith, but axially movable relative to the hub. The device further includes a second clutch plate disposed axially between the radially extending wall of the rotor and the armature. The second clutch plate is coupled to the rotor for rotation therewith, but axially movable relative to the rotor. The device further includes a field shell disposed about the hub on an opposite side of the radially extending wall of the rotor from the armature. The field shell houses a conductor therein. The armature and the first and second clutch plates are configured for movement in a first axial direction towards the radially extending wall of the rotor upon energization of the conductor to thereby cause frictional engagement of the first and second clutch plates and coupling of the rotor to the hub for rotation therewith. The armature and first and second clutch plates are further configured for movement in a second axial direction opposite the first axial direction upon subsequent deenergization of the conductor. At least one of the hub and the rotor includes means for limiting movement of a corresponding one of the first and second clutch plates in the second axial direction. A rotational coupling device in accordance with this embodiment of the invention is advantageous as compared to conventional devices because it permits effective use of the device in a vertical orientation by maintaining separation between the clutch plates when the clutch is disengaged despite gravitational forces acting on the clutch plates.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
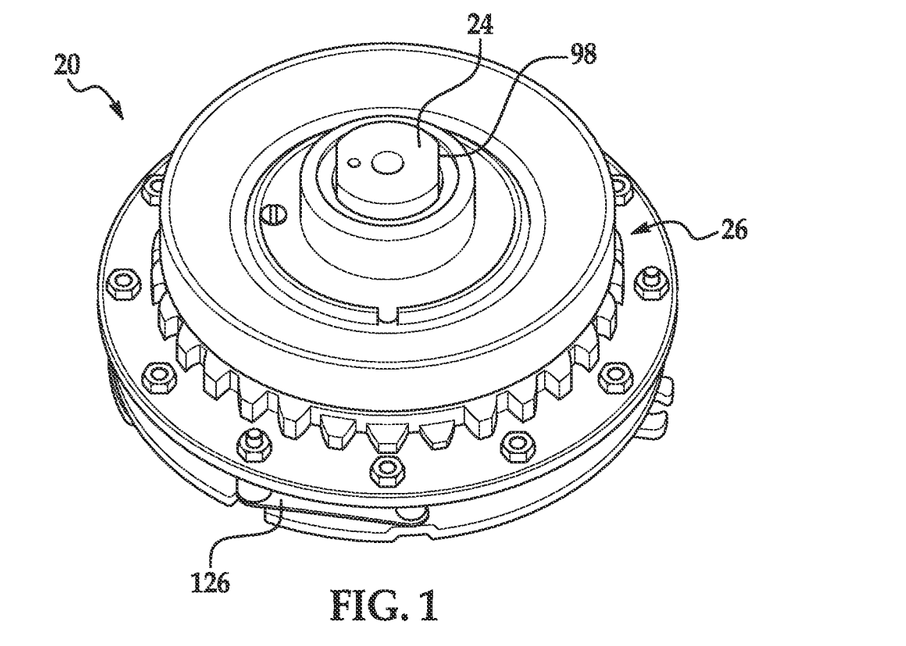
FIGS. 1-2 are perspective views of a rotational coupling device in accordance with the present invention.
Figure 2:
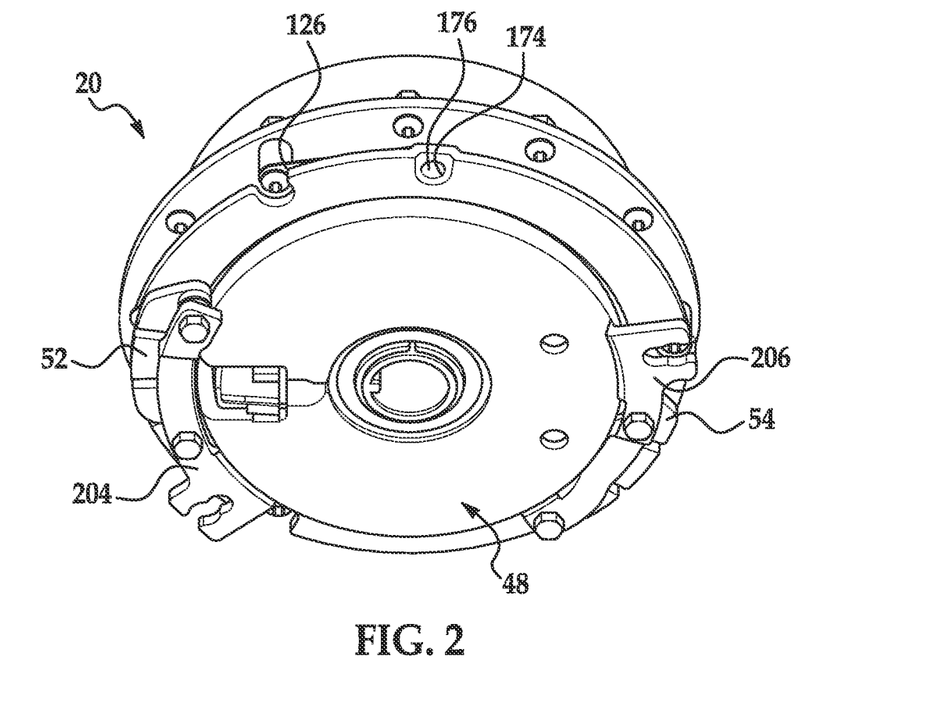
Figure 3:
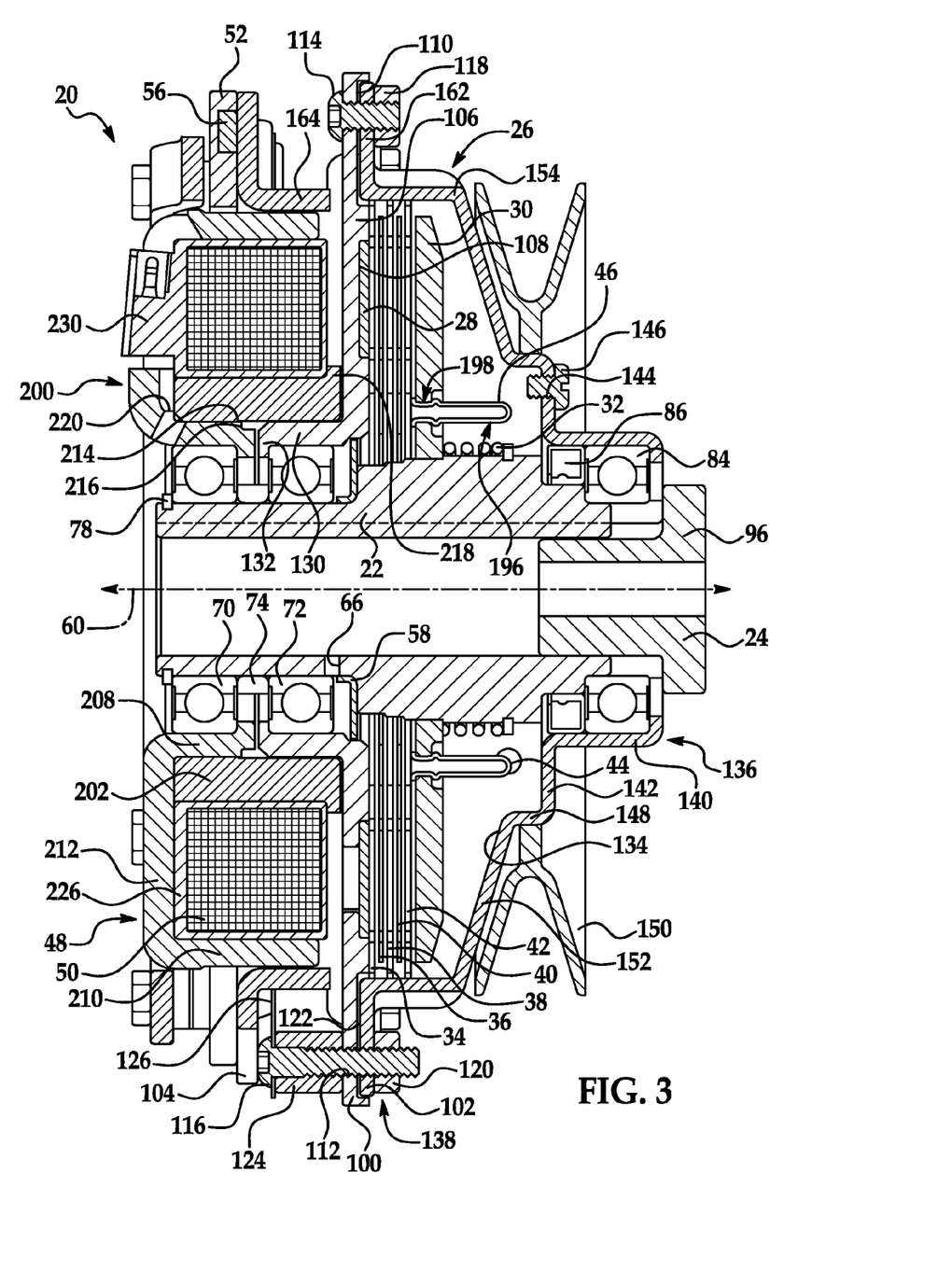
FIG. 3 is a cross-sectional view of the rotational coupling device in FIGS. 1-2.

Referring now to the drawings wherein like reference numerals are used to identify identical components in the various views, FIGS. 1-3 illustrate a rotational coupling device 20 in accordance with one embodiment of the invention. Device 20 functions as a clutch to selectively transfer torque from a rotating shaft (not shown) driven by an engine, electric motor or other conventional power source. Device 20 also functions as a brake when torque is not being transferred. Device 20 may be provided for use in a lawnmower or similar device. It will be understood by those of ordinary skill in the art, however, that device 20 may be used in a wide variety of applications requiring a clutch and/or brake. Device 20 may include a hub 22, a spacer 24, a rotor 26, a sealing plate 28, an armature 30, a spring 32, clutch plates 34, 36, 38, 40, 42, means, such as tubes 44, 46, for transporting fluid from a sump to clutch plates 34, 36, 38, 40, 42, a field shell 48, a conductor 50, brake plates 52, 54 (see FIG. 14), means, such as magnets 56 for urging a portion of the rotor 26 towards brake plates 52, 54, and a fluid slinger 58.

Figure 4:
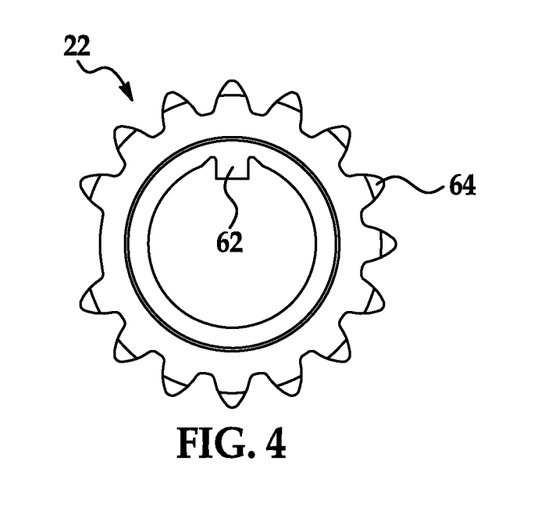
FIG. 4 is a plan view of the hub of the device in FIGS. 1-2.
Figure 5:
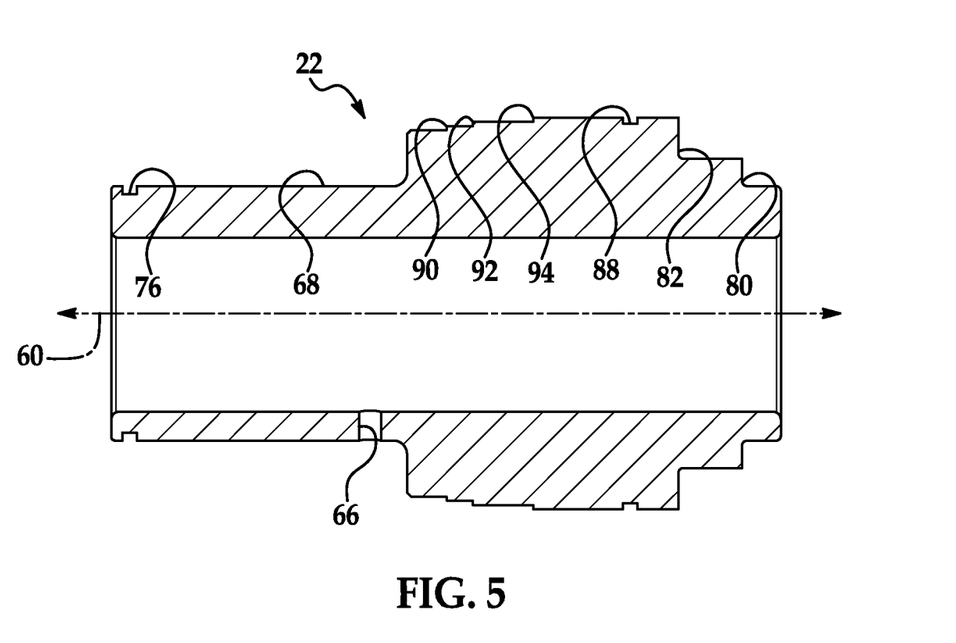
FIG. 5 is a cross-sectional view of the hub of the device in FIGS. 1-2.

Hub 22 transfers torque from a rotating shaft (not shown) to armature 30 and clutch plates 36, 40. Hub 22 may be made from conventional metals and metal alloys. Hub 22 is annular and is disposed about the rotating shaft and an axis 60 of rotation for the shaft. Referring to FIG. 4, a radially inner surface of hub 22 may define a radially inwardly extending key 62 configured to be received within a corresponding keyway in the rotating shaft to couple hub 22 to the shaft for rotation therewith. It should be understood that hub 22 may alternatively define a keyway configured to receive a corresponding key in the rotating shaft or may be coupled to the shaft using a variety of other conventional coupling methods. The radially outer surface of hub 22 may define a plurality of radially outwardly extending splines 64 configured to be received within corresponding notches in armature 30 and clutch plates 36, 40. The circumferential spacing between splines 64 may vary as shown in FIG. 4 for a purpose described hereinbelow. Referring now to FIG. 5, a vent bore 66 may extend between the radially inner and outer surfaces of hub 22 for a purpose described hereinbelow. Bore 66 may extend in a direction perpendicular to axis 60. As shown in FIG. 5, the outer diameter of hub 22 may vary along its axial length. Hub 22 defines an elongate surface 68 at one axial end configured, as illustrated in FIG. 3, to receive field shell and rotor bearings 70, 72, and a spacer 74 disposed between bearings 70, 72. The same surface 68 is configured to receive fluid slinger 58. Referring again to FIG. 5, a groove 76 formed near one axial end of surface 68 is configured to receive a retainer ring 78 (see FIG. 3) used to facilitate assembly of device 20 and maintain the position of bearings 70, 72, and other components of device 20. The opposite axial end of hub 22 defines a pair of shoulders 80, 82, configured, as illustrated in FIG. 3, to receive another rotor bearing 84 and a fluid seal 86. Referring again to FIG. 5, hub 22 further defines a groove 88 configured to receive a retainer ring which anchors the end of spring 32.

Figure 6:
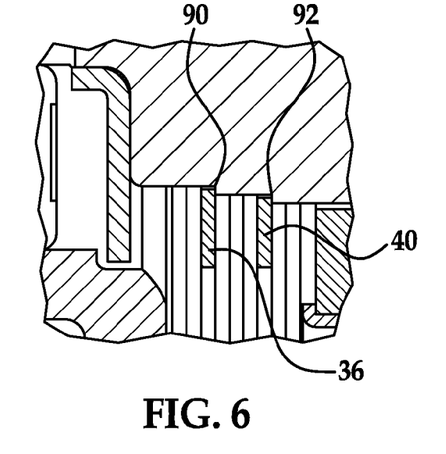
FIG. 6 is an enlarged cross-sectional view of a portion of the device in FIGS. 1-2 illustrating the interface between the hub and clutch plates of FIGS. 1-2.

In accordance with one embodiment of the invention, hub 22 further includes means, such as shoulders 90, 92, 94, for limiting movement of clutch plates 36, 40 and armature 30 in one axial direction. The outer diameter of hub 22 varies to define steps and shoulders 90, 92, 94, with the diameter increasing moving axially from clutch plate 36 to armature 30 such that the radial distances from axis 60 to shoulder 90, 92, 94 are different. When device 20 is oriented vertically, gravitational force urges armature 30 and clutch plates 36, 40, in one axial direction (to the right in FIG. 3). When the clutch of device 20 is disengaged, therefore, gravitational force may result in undesirable contact among armature 30 and clutch plates 34, 36, 38, 40, 42. Referring to FIG. 6, shoulders 90, 92, 94 limit movement of plates 36, 40 and armature 30 to prevent such contact.

Referring again to FIG. 3, spacer 24 is provided to retain bearing 84 in assembled relation to the other components of device 20. Spacer 24 may be made from conventional metals and metal alloys. Spacer 24 is disposed about axis 60 and is generally cylindrical in shape. Spacer 24 is configured to receive a fastener (not shown) that extends through spacer 24 and into the rotating shaft. Spacer 24 may define a head 96 at one axial end. Referring to FIG. 1, head 96 may have a plurality of flats 98 that allow the rotating shaft to be secured while applying torque to the fastener. Head 96 also opposes shoulder 80 in hub 22 to prevent axial movement of bearing 84. Spacer 24 may further define a keyway in a radially outer surface configured to receive key 62 of hub 22.

Rotor 26 provides a means for transferring torque to an output member. Rotor 26 provides a reaction surface against which armature 30 compresses clutch plates 34, 36, 38, 40, 42 to couple rotor 26 to hub 22 for rotation with hub 22. In accordance with another aspect of the invention as discussed below, rotor 26 may also function as a part of a brake for the output member when the clutch is disengaged. Rotor 26 is disposed about hub 22 and axis 60 and may include several members 100, 102, 104 which may be made from conventional metals and metal alloys.

Figure 7:
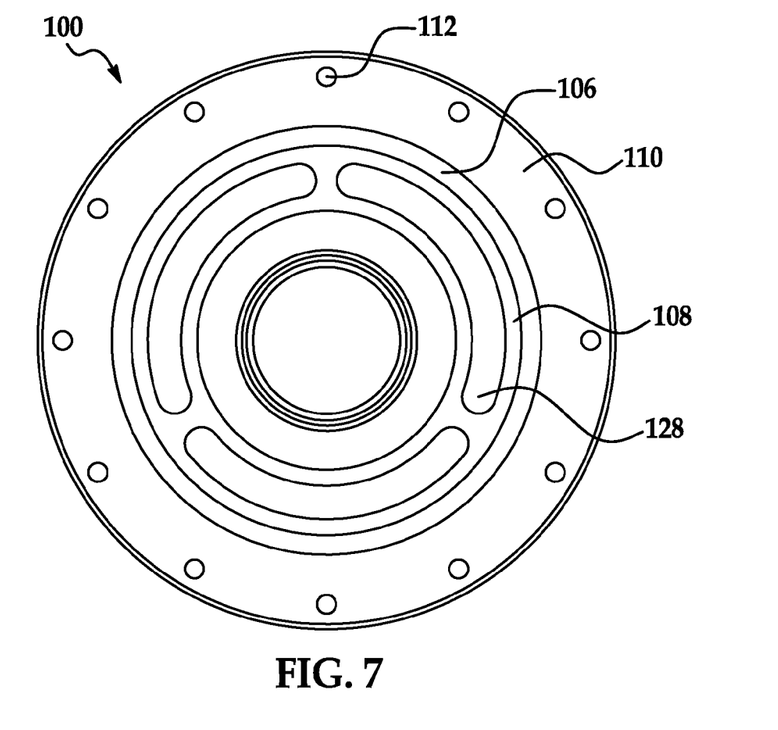
FIG. 7 is a plan view of the rotor of the device in FIGS. 1-2.

Member 100 is annular in shape and disposed about axis 60. Member 100 defines a radially extending wall 106. Wall 106 defines radially outer and inner circular recesses 108, 110 in one axial side of wall 106. Outer recess 110 is configured to receive a portion of member 102 of rotor 26. Inner recess 108 is configured to receive sealing plate 28. Wall 106 further defines a plurality of apertures 112 extending axially therethrough and in communication with outer recess 110. Apertures 112 are configured to receive fasteners 114, 116 used to couple member 100 to member 102 of rotor 26. In the illustrated embodiment, fasteners 114, 116, comprise screws secured in place by nuts 118, 120, respectively. It should be understood, however, that other types of fasteners such as bolts, pins, welds or adhesives could alternatively be used. Fasteners 114, 116 extend through a gasket 122 that functions as a seal between members 100, 102. Fasteners 116 are longer than fasteners 114 and extend through spacers 124 used to support leaf springs 126. Each of fasteners 116 is used to secure one end of a corresponding leaf spring 126 extending between members 100, 104 of rotor 26 for a purposed described hereinbelow. Referring to FIG. 7, wall 106 may further include one or more radially spaced rows of circumferentially spaced, banana shaped slots 128. Upon energization of conductor 50, slots 128 help to direct the flow of magnetic flux between wall 106 of member 100 of rotor 26 and armature 30. In the illustrated embodiment, wall 106 includes a single row of three slots 128. It should be understood, however, that the number of rows of slots 128 the number of slots 128 in any one row, and the size and shape of slots 128 may vary. Referring again to FIG. 3, slots 128 are in communication with inner recess 108. Member 100 further defines an axially extending radially inner rotor pole 130 extending from a radially inward end of wall 106. Pole 130 is supported on rotor bearing 72 and includes a radially inwardly extending flange 132 at one axial end opposite wall 106 to limit movement relative to bearing 72.

Figure 8:
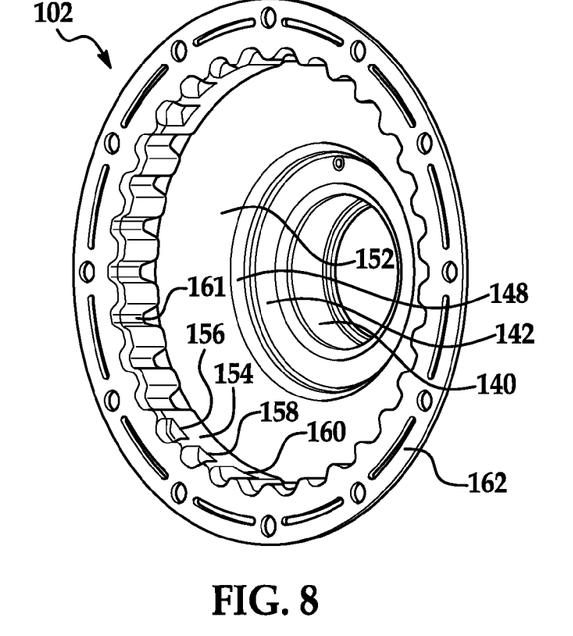
FIG. 8 is a perspective view of a portion of the rotor of the device in FIGS. 1-2.

In accordance with another aspect of the invention, member 100, together with member 102, forms a substantially enclosed chamber 134 housing armature 30, clutch plates 34, 36, 38, 40, 42 and a lubricating fluid such as oil. Accordingly, device 20 is not dependent upon fluid integration with other devices to provide lubricating fluid and does not require the design of custom housings for different applications. Member 102 is annular in construction and has a diameter that generally increases from one axial end 136 of member 102 farthest from member 100 to an opposite axial end 138 adjacent member 100. Member 102 defines an axially ending wall 140 proximate end 136 sized to receive bearing 84 and seal 86. Wall 140 defines a radially inwardly extending flange at one end configured to retain bearing 84. A wall 142 extends radially from the opposite end of axially extending wall 140. Wall 142 forms the bottom of a fluid sump when device 20 is oriented vertically. Fluid may be inserted or removed through a fill port 144 in which a plug 146 is disposed. Another axially extending wall 148 extends from the opposite end of radially extending wall 142. Wall 148 may be configured to support an output member 150. In the illustrated embodiment member 150 comprises a pulley. It should be understood, however, that member 150 could take on a variety of forms including gears. Another wall 152 extends from axially extending wall 148 in a generally radial direction, but at an angle to axis 60. Wall 152 terminates in another axially extending wall 154. Referring now to FIG. 8, in accordance with one embodiment of the invention, wall 154 may include means, such as shoulders 156, 158, 160 for limiting movement of clutch plates 34, 38, 42 in one axial direction. Wall 154 may define a plurality of axially extending grooves 161 in a radially inner surface configured to receive corresponding teeth 181 on clutch plates 34, 38, 42 (see FIG. 11). At one or more circumferentially spaced sections, however, a set (equal in number to the number of clutch plates 34, 38, 42) of adjacent grooves are axially shortened to define shoulders 156, 158, 160. In the illustrated embodiment, grooves 161 are axially shortened in three equally circumferentially spaced sections on wall 154. It should be understood, however, that the number of sections may vary. The axial length of the grooves 161 in which shoulders 156, 158, 160 are formed varies to maintain a predetermined spacing between clutch plates 34, 38, 42 when the clutch is disengaged. When device 20 is oriented vertically, gravitational force urges clutch plates 34, 38, 42 in one axial direction (to the right in FIG. 3). When the clutch of device 20 is disengaged, therefore, gravitational force may result in undesirable contact among clutch plates 34, 36, 38, 40, 42 and armature 30. The shoulders 156, 158, 160 on wall 154 limit movement of plates 34, 38, 42 to prevent such contact. Referring again to FIG. 3, a radially outwardly extending flange 162 extends from wall 154 and is configured to be received within recess 110 of member 100. Flange 162 defines a plurality of apertures configured to received fasteners 114, 116.

Figure 9:
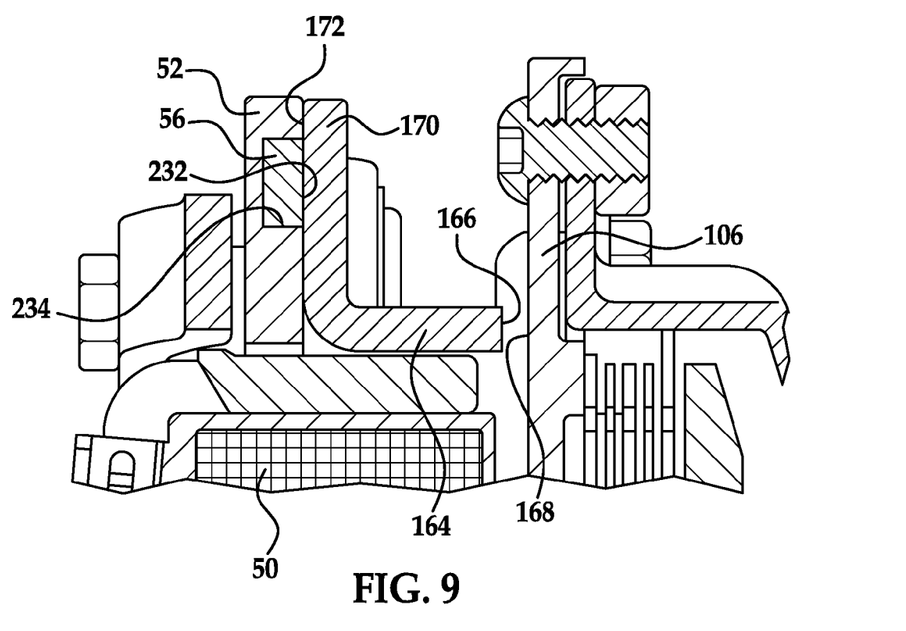
FIG. 9 is an enlarged cross-sectional view of a portion of the device in FIGS. 1-2 illustrating a portion of the rotor of the device in FIGS. 1-2.

Member 104 defines an axially extending, radially outer rotor pole 164. Member 104 may comprise a unitary body (i.e. a single piece structure without any type of fasteners such as screws, adhesives or welds to couple multiple pieces together). Referring to FIG. 9, pole 164 defines a coupling surface 166 at one axial end configured to engage a corresponding coupling surface 168 formed in wall 106 of member 100. Member 104 further defines a radially extending flange 170 extending from pole 164. In accordance with one aspect of the invention, flange 170 defines a braking surface 172 configured to engage a corresponding braking surfaces on brake plates 52, 54. Referring to FIG. 2, flange 170 further defines a plurality of apertures 174 through which fasteners 176 such as rivets may extend with each fastener 176 coupled to one end of a corresponding leaf spring 126. When the clutch is disengaged, member 104 is urged in one axial direction towards brake plates 52, 54 (to the left in FIGS. 3 and 9) as discussed hereinbelow such that coupling surface 166 disengages from coupling surface 168 and braking surface 172 engages the braking surfaces on brake plates 52, 54. As a result, a fluid flow opening is created between the coupling surfaces 166, 168 on members 104, 100, which permits drainage of any fluid (e.g. water) from operating in wet environments. When the clutch is engaged, member 104 is drawn in an opposite axial direction towards member 100 (to the right in FIGS. 3 and 9) by electromagnetic attraction such that braking surface 172 disengages from the braking surfaces on brake plates 52, 54, and coupling surface 166 engages coupling surface 168 on member 100. The integration of the rotor outer pole 164 and braking surface 172 provides a simpler design than conventional devices and also provides an efficient way for removing liquids from device 20 when device 20 is used in a wet environment. Further, the design minimizes the time that both the brake is applied and the clutch is engaged during transitions between engagement and disengagement of the clutch thereby avoiding undesirable wear and heat. The design also increases the speed of disengagement of the brake and engagement of the clutch relative to conventional designs thereby providing an improved feel to the user.

Referring again to FIG. 3, in accordance with another aspect of the invention, means, such as sealing plate 28, are provided to prevent fluid from exiting chamber through slots 128 in member 100 of rotor 26. Plate 28 is ring shaped and configured to be received within recess 108 in member 100 of rotor 26. Plate 28 is made from a non-magnetic material or a material having a greater magnetic reluctance than member 100 of rotor 26. The construction of member 100 of rotor 26 and plate 28 allows the use of slots 128 in member 100, and the increased strength in the electromagnetic circuit resulting from their use, in applications requiring a wet device. To prevent fluids from gathering in slots 128 on the opposite side of plate 28 from chamber 134 when device 20 is used in a wet environment, an epoxy may be used to fill slots 128.

Figure 10:
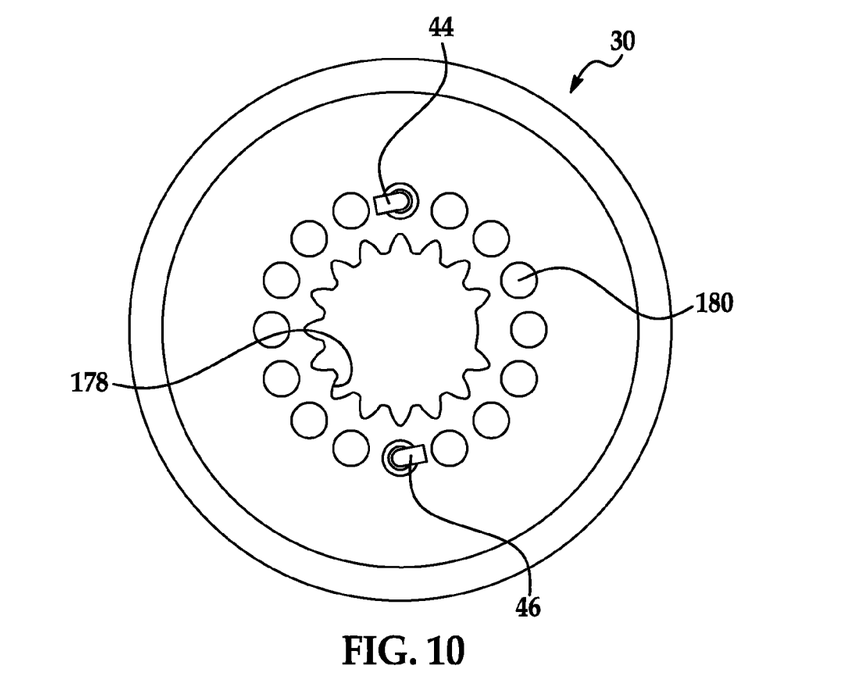
FIG. 10 is a plan view of the armature of the device in FIGS. 1-2.

Armature 30 is provided to engage the clutch by urging plates 34, 36, 38, 40, 42 into frictional engagement. Armature 30 may be made from metals or metal alloys or other materials having relatively low magnetic reluctance. In one accordance with one aspect of the invention, however, the radially innermost portion of armature 30 may be made from a material having a higher magnetic reluctance than the rest of armature 30 to limit or prevent flux transfer to hub 22 and undesirable electromagnetic attraction between armature 30 and hub 22. Armature 30 is disposed about hub 22 and axis 60 on one axial side of wall 106 of rotor 26. Referring to FIG. 10, armature 30 is annular in shape and defines a plurality of notches 178 in a radially inner surface configured to engage splines 64 on hub 22. Armature 30 further defines a plurality of circumferentially spaced fluid apertures 180 between the radially inner and outer surfaces of armature 30. Apertures 180 may be sized to receive tubes 44, 46 as discussed in greater detail hereinbelow. Apertures 180 may be nearer a radially inner diameter or surface of armature 30 than a radially outer diameter or surface of armature 30.

Referring again to FIG. 3, in accordance with another aspect of the invention, spring 32 may be used to bias armature 30 in one axial direction (to the left in FIG. 3) to counteract an opposing gravitational force biasing armature 30 in the opposite axial direction (to the right in FIG. 3) when device 20 is oriented vertically. Spring 32 may be made from conventional metals and metal alloys. One end of spring 32 may be positioned against a retaining ring disposed within groove 88 in hub 22 while the opposite end of spring 32 engages armature 30. The use of spring 32 permits faster engagement of the clutch because armature 30 does not have to overcome the gravitational force biasing armature 30 away from clutch plates 34, 36, 38, 40, 42.

Clutch plates 34, 36, 38, 40, 42 are provided to transfer torque from hub 22 to output member 150 by coupling rotor 26 to hub 22 for rotation. Clutch plates 34, 36, 38, 40, 42 may be made from conventional metals and metal alloys and be treated for wear and corrosion resistance using the process offered under the registered trademark "NITROTEC" by TTI Group Ltd. of the United Kingdom or equivalents. Clutch plates 34, 36, 38, 40, 42 are disposed between armature 30 and radially extending wall 106 of member 100 of rotor 26. In the illustrated embodiment, three clutch plates 34, 38, 42 are coupled to member 102 of rotor 26 for rotation therewith, but are axially movable relative to member 102 of rotor 26 while two clutch plates 36, 40 are coupled to hub 22 for rotation therewith, but are axially movable relative to hub 22. Each of plates 36, 40, is disposed between a corresponding pair 34, 38, and 38, 42, respectively of plates 34, 38, 42. It should be understood that the number and ordering of clutch plates may vary. Springs (not shown) may be disposed between plates 34, 36, 38, 40, 42 to prevent rattle.

Figure 11:
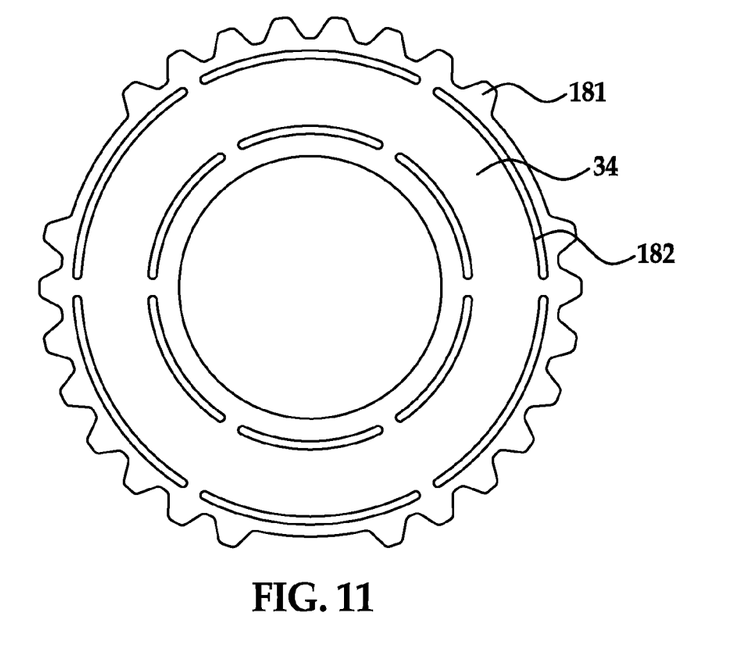
FIGS. 11-13 are plan views of various clutch plates of the device in FIGS. 1-2.

Referring to FIG. 11, clutch plates 34, 38, 42 are annular in shape and defines a plurality of teeth 181 in a radially outer surface configured to engage corresponding teeth on a radially inner surface of wall 154 of member 102 of rotor 26. Plates 34, 38, 42 further define a pair of radially spaced rows of circumferentially spaced, banana shaped slots 182. Upon energization of conductor 50, slots 182 serve to direct magnetic flux to travel between wall 106 of rotor 26 and armature 30 along the radially inner and outer peripheries of plates 34, 38, 42. It should be understood that the number of slots 182 in any one row, and the size and shape of slots 182 may vary.

Figure 12:
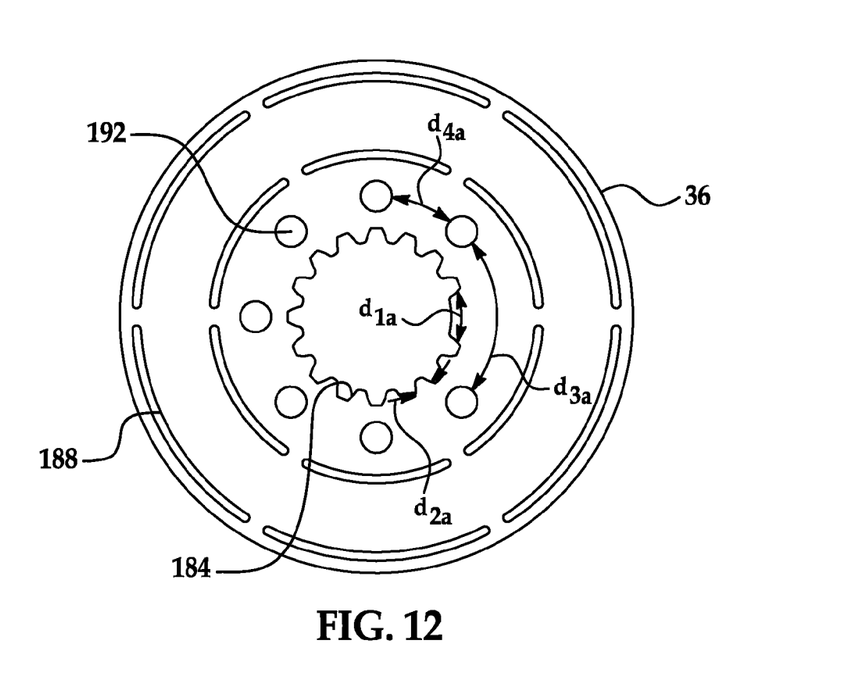
Figure 13:
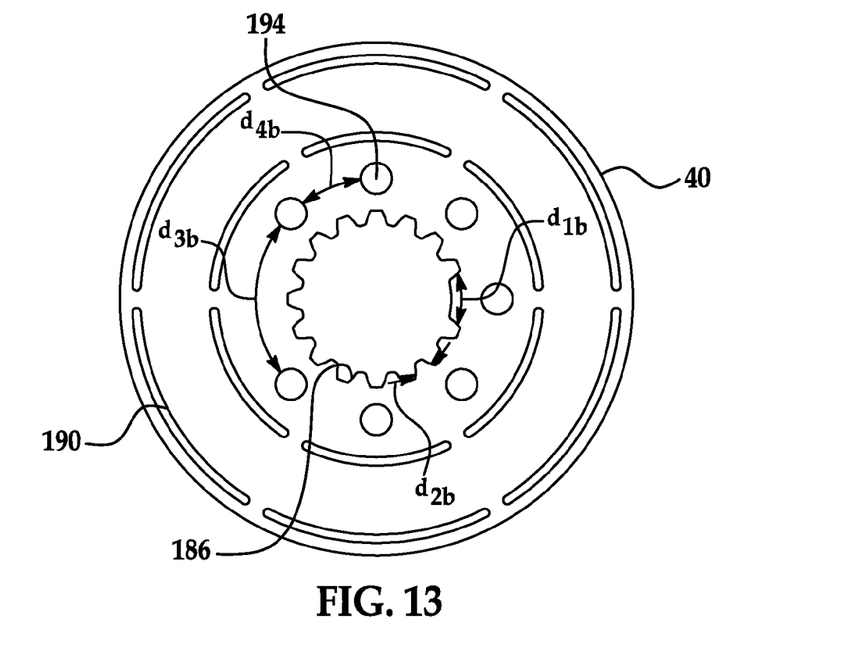

Referring now to FIGS. 12-13, clutch plates 36, 40 are annular in shape and define a plurality of circumferentially spaced notches 184, 186, respectively, in a radially inner surface configured to receive splines 64 on hub 22. Plates 36, 40 further define a pair of radially spaced rows of circumferentially spaced, banana shaped slots 188, 190, respectively. As with slots 182 in plates 34, 38, 42, upon energization of conductor 50, slots 188, 190 serve to direct magnetic flux to travel between rotor 26 and armature 30 along the radially inner and outer peripheries of plates 36, 40. It should be understood that the number of slots 188, 190 in any one row, and the size and shape of slots 188, 190 may vary. Plates 36, 40 further define a plurality of circumferentially spaced fluid apertures 192, 194 respectively, disposed radially between the radially inner surface of plates 36, 40 and the radially inner row of slots 188, 190, respectively. Apertures 192, 194 permit passage of fluid for lubrication of plates 34, 36, 38, 40, 42.

In accordance with another aspect of the invention, the circumferential spacing between notches 184, 186 on clutch plates 36, 40 varies such that a circumferential gap $d_{1a}$, $d_{1b}$ between a pair of adjacent notches 184, 186 on each plate 36, 40 is greater than a circumferential gap $d_{2a}$, $d_{2b}$ between other pairs of notches 184, 186 on each plate 36, 40. Similarly, the circumferential spacing between adjacent fluid apertures 192, 194 on each of clutch plates 36, 40, varies such that a circumferential gap $d_{3a}$, $d_{3b}$ between a pair of apertures 192, 194, on each plate 36, 40 is greater than a circumferential gap $d_{4a}$, $d_{4b}$ between other pairs of apertures 192, 194, on each plate 36, 40. Further, the center of the circumferential gap $d_{3a}$ between apertures 192 in plate 36 is located at a point radially outwardly of a center of the circumferential gap $d_{1a}$ between notches 184 in plate 36 while the circumferential gap $d_{3b}$ between apertures 194 in plate 40 is located diametrically opposite a point that is radially outwardly of a center of the circumferential gap $d_{1b}$ between notches 186 in plate 40. The different arrangement of the fluid apertures 192, 194 relative to notches 184, 186 in plates 36, 40 facilitates proper assembly of device 20 by providing a visual cue to the proper ordering of plates 36, 40.

In accordance with another aspect of the invention, means, such as fluid transport tubes 44, 46, for transporting fluid from the sump to clutch plates 34, 36, 38, 40, 42 are provided. Referring to FIGS. 3 and 10, tubes 44, 46 extend through apertures 180 in armature 30. In the illustrated embodiment two tubes are used that extend through diametrically opposite apertures 180 and are therefore diametrically opposite one another. It should be understood, however, that the number of tubes and their orientation may vary. Referring to FIG. 3, each tube 44, 46 has one end 196 defining a fluid inlet and submerged in the fluid in the sump. Each tube 44, 46 further extends through a corresponding aperture 180 in armature 30 and has an opposite end 198 defining a fluid outlet disposed within apertures 180 in armature 30 or on an opposite side of armature 30 from the fluid inlet. The fluid inlet and outlet may be oriented such that a direction of fluid flow through the inlet is different than a direction of fluid flow through the outlet. In particular, the direction of fluid flow through the inlet may be perpendicular to the direction of fluid flow through the outlet. As shown in FIG. 3, fluid may exit the outlet in a direction parallel to the rotational axis 60. Referring to FIG. 10, fluid may enter the inlet in a circumferential direction relative to the axis of rotation. Alternatively, tubes 44, 46 may be oriented such that fluid enters the inlet in a radial direction relative to the axis of rotation, particularly in applications where device 20 has a horizontal orientation. Rotation of armature 30 enables ends 196 of tubes 44, 46 to scoop fluid from the sump and draws fluid through tubes 44, 46, where it may be deposited onto clutch plates 34, 36, 38, 40, 42.

Referring again to FIG. 3, field shell 48 is provided to house conductor 50. Shell 48 also forms part of an electromagnetic circuit that causes the selective engagement of wall 106 of member 100 of rotor 26, armature 30, and clutch plates 34, 36, 38, 40, 42 to rotatably couple hub 22 and rotor 26. Field shell 48 may be made from conventional metals and metal alloys, including steel. Shell 48 is cylindrical and is disposed about hub 22 and axis 60 and is supported on an outer race of field shell bearing 70. Referring to FIGS. 2 and 3, shell 48 is fixed against rotation and includes members 200, 202, 204, 206. In accordance with one aspect of the invention, shell 48 is disposed on an opposite side of wall 106 of rotor 26 relative to armature 30 and clutch plates 34, 36, 38, 40, 42 and is isolated from the fluid in chamber 134. As a result, the design of device 20 is less complex than conventional designs because no fluid seals or other methods to prevent exposure to fluids are required around the conductor 50 or any electrical connections.

Member 200 is generally U-shaped in cross-section and defines axially extending, radially inner and outer poles 208, 210 with a radially extending end wall 212 extending therebetween. Member 200 is sized to receive member 202 and conductor 50 between poles 208, 210. Inner pole 208 is axially aligned with inner pole 130 of rotor 26 while outer pole 210 is disposed radially inwardly of outer pole 164 of rotor 26. In accordance with another aspect of the invention, the stampings for member 200 of field shell 48 and member 100 of rotor 26 share a common pocket design for field shell bearing 70 and rotor bearing 72, respectively, and may be made from the same blank size with a common tool and then press and formed to the desired shape and form.

Member 202 is annular in construction and is disposed within member 200 radially between inner and outer filed shell poles 208, 210. Member 202 is configured to receive conductor 50. Member 202 is supported on inner field shell pole 208. Member 202 forms a part of the electromagnetic circuit referred to hereinabove and, like inner pole 208 of member 200, directs magnetic flux from inner rotor pole 130 to end wall 212 of member 200 as well as to the outer diameter of inner field shell pole 208. The inner diameter of member 202 may vary to define a shoulder 214 intermediate the axial ends of member 202. In accordance with one aspect of the invention, a portion 216 of the inner pole 208 of member 200 may be deformed (e.g. by staking) to limit axial movement of member 202 in one axial direction (to the right in FIG. 3). The outer diameter of member 202 may also vary such that member 202 defines a radially outwardly extending flange 218 at one axial end configured to engage conductor 50 and prevent movement of conductor 50 in one axial direction (to the right in FIG. 3).

In accordance with another aspect of the invention, members 200, 202 define a fluid passage 220 configured to remove moisture from one axial side of bearing 70. When device 20 is used in wet environments and mounted vertically, the possibility exists for fluid to accumulate on one side of bearing 70 between hub 22 and field shell 48. A fluid passage 220 is therefore formed including a bore extending from a radially inner surface of inner pole 208 to a radially outer surface of pole 208 and a space between members 200, 202 to divert fluid from bearing 70 and, ultimately, expel such fluid through the fluid flow opening between coupling surfaces 166, 168, on members 104, 100 of rotor 26.

Figure 14:
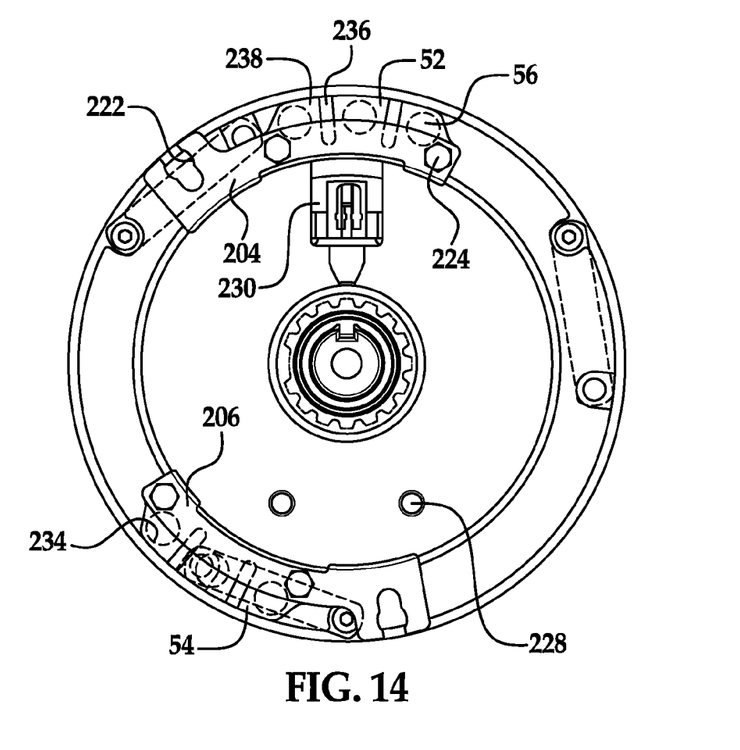
FIG. 14 is a plan view of the field shell of the device in FIGS. 1-2.

Referring to FIG. 14, members 204, 206 provide a means for mounting brake plates 52, 54 and provide a means for fixing field shell 48 against rotation. Members 204, 206 extend radially outwardly from member 200 and are affixed to member 200 by welds or other fasteners. Members 204, 206, may be identical in construction. Each of members 204 206 defines a slot 222 proximate one circumferential end configured to receive a bolt or other fastener to counteract field shell rotation. Each member 204, 206 further defines a pair of circumferentially spaced apertures configured to receive fasteners 224 extending axially therethrough and into brake plates 52, 54.

Referring again to FIG. 3, conductor 50 is provided to create an electromagnetic circuit among rotor 26, armature 30 and field shell 48 in order to cause armature 30 to move in one axial direction (to the left in FIG. 3) and press clutch plates 34, 36, 38, 40, 42 into frictional engagement in order to couple wall 106 of member 100 of rotor 26 to hub 22 for rotation therewith. Conductor 50 may comprise a conventional aluminum coil although other conventional conductors may alternatively be used. Conductor 50 is disposed within a housing 226 that may be used to mount conductor 50 within field shell 48. Housing 226 may be molded from conventional plastics and, referring to FIG. 14, includes anti-rotation pins 228 extending through apertures in end wall 212 of member 200 of field shell 48. Housing 226 may further include an integral terminal connector 230 through which conductor 50 may be electrically connected to a power source. Referring again to FIG. 3, in accordance with one aspect of the invention, the terminal connector 230 may be configured such that it slopes away from axis 60 in order to allow gravity to direct any moisture radially outward when device 20 is operated in wet environments. Conductor 50 and housing 226 are generally annular and are disposed about hub 22 and axis 60 within field shell 48. In particular, conductor 50 and housing 226 are disposed between the inner and outer poles 208, 210 of shell 48 and end wall 212 and are supported on member 202 of shell 48. Upon energization of conductor 50, an electromagnetic circuit is formed between wall 106 of member 100 of rotor 26, armature 30 and field shell 48. Magnetic flux flows from outer pole 210 of shell 48 across an air gap to outer pole 164 of rotor 26. Flux then travels from outer rotor pole 164 to wall 106 of member 100 of rotor 26 across another air gap. Flux then travels across a radially outer portion of clutch plates 34, 36, 38, 40, 42 to armature 30 and back to wall 106 and inner rotor pole 130 across a radially inner portion of clutch plates 34, 36, 38, 40, 42. A portion of this flux also travels into member 202 of field shell 48 across air gaps between wall 106 and member 202 and between pole 130 and member 202. Flux then travels from inner rotor pole 130 and member 202 of field shell 48 across air gaps to inner field shell pole 208 and end wall 212 and returns through end wall 212 of field shell 48. Although the illustrated embodiment employs an electromagnetic circuit having two poles, it should be understood that the circuit could alternatively employ more poles (e.g. four or six poles).

Brake plates 52, 54 provide a means for applying a braking torque to rotor 26 when conductor 50 is deenergized. Brake plates 52, 54 may be made from conventional materials having a relatively low magnetic reluctance including conventional metals and metal alloys such as steel. Referring to FIG. 14, brake plates 52, 54 extends about at least a portion of the circumference of device 20, and preferably only a portion of the circumference of device 20, and are coupled to members 204, 206, of field shell 48. In particular, brake plates 52, 54 are coupled to members 204, 206 and suspended therefrom using fasteners 224. Referring to FIG. 9, brake plates 52, 54 define a braking surface 232 configured to engage braking surface 172 of member 104 of rotor 26 upon deenergization of conductor 50. Brake plates 52, 54 also define a plurality of bores 234 configured to receive magnets 56. Bores 234 extend through an axial portion of brake plates 52, 54 and comprise closed bores as shown in the illustrated embodiment. Referring to FIG. 14, brake plates 52, 54 may further define a plurality of slots 236 between tabs 238 in which the magnets 56 are disposed in order to magnetically isolate each magnet from other magnets.

Magnets 56 are provided to create a magnetic circuit between brake plates 52, 54 and member 104 of rotor 26 to draw member 104 into engagement with brake plates 52, 54 and provide a braking torque to rotor 26 and output member 150. Magnets 56 may comprise neodymium iron boron (Nd—Fe—B) magnets or other known permanent magnets. Magnets 56 may be embedded within bores 234 of brake plates 52, 54 and may be secured therein using an adhesive. Magnets 56 may be arranged such that one face of the magnet 56 is flush with one side (and the braking surface 232) of brake plates 52, 54. By placing the magnets 56 such that one face is flush with the engagement surface of brake plates 52, 54 magnets 56 add to the wear surface of brake plates 52, 54 increasing their wear resistance and the braking surface. Magnets 56 may be circumferentially spaced from one another about the circumferential extent of brake plates 52, 54 and each magnet 56 may be disposed in a tab 238 of brake plates 52, 54, separated by slots 236 in brake plates 52, 54. Alternatively, more than one magnet 56 may be disposed in a single tab 238 (and/or slots 236 eliminated) provided that the magnets 56 are appropriately spaced from one another. Magnets 56 may also be disposed in every other tab 236 to increase wear surface. It will further be appreciated that the number and location of magnets 56 within brake plates 52, 54 may vary depending upon the characteristics of device 20 and related design requirements. Magnets 56 may be arranged such that the facing poles of adjacent magnets 56 are of like polarity thereby forming parallel magnetic circuits. Alternatively, magnets 56 may be arranged such that the facing poles of adjacent magnets 56 are of opposite polarity thereby forming a less efficient series magnetic circuit. Magnets 56 are axially aligned with flange 170 of member 104 of rotor 26 such that magnetic flux travels axially through magnets 56. In particular, magnetic flux travels through one pole of each magnet 56 (located at the radial center of magnet 56) across an air gap into member 104 of rotor 26. Flux continues to travel radially inwardly and outwardly along member 104 and then axially across an air gap and radially through brake plates 52, 54 to return to an opposite pole of each magnet 56 located on the opposite axial end of magnet 56.

In accordance with another aspect of the invention, brake plates 52, 54, and their associated magnets 56 are asymmetrically arranged. In particular, brake plates 52, 54 are not diametrically opposed from one another, and the circumferential center of brake plate 52 is less than one hundred and eighty degrees from the circumferential center of brake plate 54. Upon energization of conductor 50, a portion of member 104 of rotor 26 circumferentially opposite brake plates 52, 54, is able to quickly engage wall 106 of member 100 of rotor 26, tipping member 104 relative to axis 60 thereby increasing the air gap between the braking surfaces 172, 232 of member 104 and brake plates 52, 54 and weakening the magnetic circuit between magnets 56 and member 104 and reducing clutch engagement time.

Figure 15:
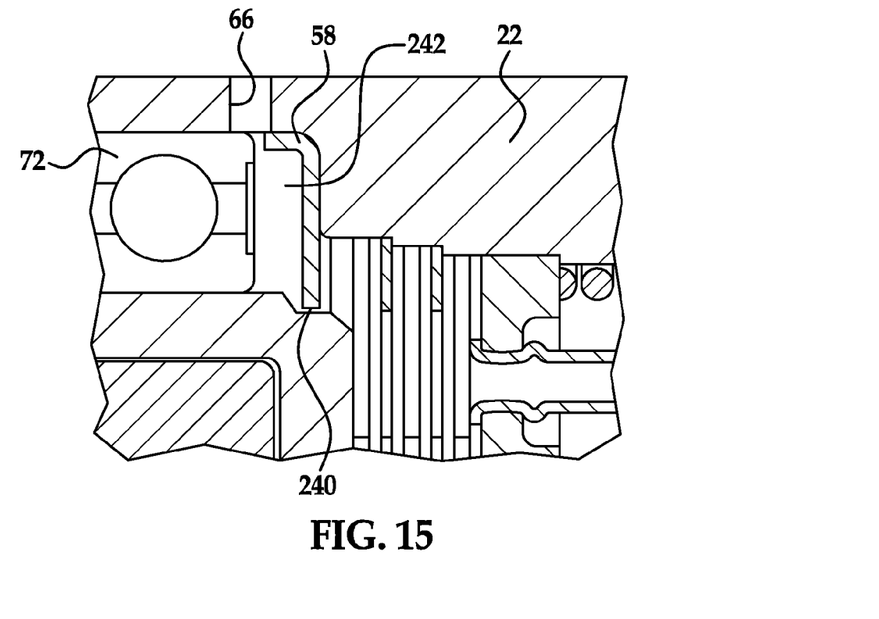
FIG. 15 is an enlarged cross-sectional view of a portion of the device in FIGS. 1-2 illustrating the venting of vapor in the device in FIGS. 1-2.

Referring to FIG. 15, fluid slinger 58 is provided to direct the return of fluid to the sump. Slinger 58 may be made from conventional metal and metal alloys having a relatively high magnetic reluctance including stainless steel or aluminum. Slinger 58 is disposed about hub 22 on an opposite side of clutch plates 34 36 38, 40, 42 from armature 30. Slinger 58 is disposed radially between hub 22 and wall 106 of member 100 of rotor 26. In accordance with one aspect of the invention, vent bore 66 is disposed on an opposite side of slinger 58 from clutch plates 34, 36, 38, 40, 42 to permit venting of vapor to equalize system pressure. Vent bore 66 is disposed axially between fluid slinger 58 and rotor bearing 72. Vapor from chamber 134 travels through a small opening 240 between the radially outer periphery of slinger 58 and member 100 of rotor 26, through a passage 242 formed between slinger 58 and bearing 72 and through vent bore 66. In applications where device 20 is oriented horizontally, slinger 58 may be replaced by a conventional seal and fluid is distributed by the slinger action of clutch plates 34, 36, 38, 40, 42.

While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising:
   a hub configured for coupling to a shaft for rotation with said shaft about an axis of rotation;
   a rotor supported on said hub and configured for rotation relative to said hub about said axis of rotation, said rotor defining a radially extending wall;
   an armature supported on said hub for rotation therewith, said armature axially spaced from said radially extending wall of said rotor;
   a first clutch plate disposed axially between said radially extending wall of said rotor and said armature, said first clutch plate coupled to said hub for rotation therewith, but axially movable relative to said hub;
   a second clutch plate disposed axially between said radially extending wall of said rotor and said armature, said second clutch plate coupled to said rotor for rotation therewith, but axially movable relative to said rotor; and,
   a field shell disposed about said hub on an opposite side of said radially extending wall of said rotor from said armature, said field shell housing a conductor therein;
   wherein said armature and said first and second clutch plates are configured for movement in a first axial direction towards said radially extending wall of said rotor upon energization of said conductor to thereby cause frictional engagement of said first and second clutch plates and coupling of said rotor to said hub for rotation therewith and are configured for movement in a second axial direction opposite said first axial direction upon subsequent deenergization of said conductor, at least one of said hub and said rotor defining a first shoulder configured to limit movement of a corresponding one of said first and second clutch plates in said second axial direction
   wherein said at least one of said hub and said rotor comprises said hub.

2. The rotational coupling device of claim 1, wherein another of said hub and said rotor defines a second shoulder configured to limit movement of another of said first and second clutch plates in said second axial direction.

3. A rotational coupling device, comprising:
   a hub configured for coupling to a shaft for rotation with said shaft about an axis of rotation;
   a rotor supported on said hub and configured for rotation relative to said hub about said axis of rotation, said rotor defining a radially extending wall;

an armature supported on said hub for rotation therewith, said armature axially spaced from said radially extending wall of said rotor;
a first clutch plate disposed axially between said radially extending wall of said rotor and said armature, said first clutch plate coupled to said hub for rotation therewith, but axially movable relative to said hub;
a second clutch plate disposed axially between said radially extending wall of said rotor and said armature, said second clutch plate coupled to said rotor for rotation therewith, but axially movable relative to said rotor; and,
a field shell disposed about said hub on an opposite side of said radially extending wall of said rotor from said armature, said field shell housing a conductor therein;
wherein said armature and said first and second clutch plates are configured for movement in a first axial direction towards said radially extending wall of said rotor upon energization of said conductor to thereby cause frictional engagement of said first and second clutch plates and coupling of said rotor to said hub for rotation therewith and are configured for movement in a second axial direction opposite said first axial direction upon subsequent deenergization of said conductor, at least one of said hub and said rotor defining a first shoulder configured to limit movement of a corresponding one of said first and second clutch plates in said second axial direction
a third clutch plate disposed axially between said radially extending wall of said rotor and said armature, said third clutch plate coupled to said hub for rotation therewith, but axially movable relative to said hub; and,
a fourth clutch plate disposed axially between said radially extending wall of said rotor and said armature, said fourth clutch plate coupled to said rotor for rotation therewith, but axially movable relative to said rotor;
wherein said third and fourth clutch plates are configured for movement in said first axial direction towards said radially extending wall of said rotor upon energization of said conductor and are configured for movement in said second axial direction upon subsequent deenergization of said conductor, said at least one of said hub and said rotor defining a second shoulder configured to limit movement of a corresponding one of said third and fourth clutch plates in said second axial direction.

4. The rotational coupling device of claim 3, wherein a radial distance from said axis of rotation to said first shoulder is different from a radial distance from said axis of rotation to said second shoulder.

5. The rotational coupling device of claim 3, wherein another of said hub and said rotor defines a third shoulder configured to limit movement of another of said first and second clutch plates in said second axial direction and a fourth shoulder configured to limit movement of another of said third and fourth clutch plates in said second axial direction.

6. The rotational coupling device of claim 5, wherein a radial distance from said axis of rotation to said third shoulder is different from a radial distance from said axis of rotation to said fourth shoulder.

7. A rotational coupling device, comprising:
a hub configured for coupling to a shaft for rotation with said shaft about an axis of rotation;
a rotor supported on said hub and configured for rotation relative to said hub about said axis of rotation, said rotor defining a radially extending wall;
an armature supported on said hub for rotation therewith, said armature axially spaced from said radially extending wall of said rotor;
a first clutch plate disposed axially between said radially extending wall of said rotor and said armature, said first clutch plate coupled to said hub for rotation therewith, but axially movable relative to said hub;
a second clutch plate disposed axially between said radially extending wall of said rotor and said armature, said second clutch plate coupled to said rotor for rotation therewith, but axially movable relative to said rotor; and,
a field shell disposed about said hub on an opposite side of said radially extending wall of said rotor from said armature, said field shell housing a conductor therein;
wherein said armature and said first and second clutch plates are configured for movement in a first axial direction towards said radially extending wall of said rotor upon energization of said conductor to thereby cause frictional engagement of said first and second clutch plates and coupling of said rotor to said hub for rotation therewith and are configured for movement in a second axial direction opposite said first axial direction upon subsequent deenergization of said conductor, at least one of said hub and said rotor defining a first shoulder configured to limit movement of a corresponding one of said first and second clutch plates in said second axial direction
a spring biasing said armature in said first axial direction, said spring configured to counteract an opposing force biasing said armature in said second axial direction.

8. The rotational coupling device of claim 7, wherein said spring provides a biasing force that is equal to said opposing force.

9. A rotational coupling device, comprising:
a hub configured for coupling to a shaft for rotation with said shaft about an axis of rotation;
a rotor supported on said hub and configured for rotation relative to said hub about said axis of rotation, said rotor defining a radially extending wall;
an armature supported on said hub for rotation therewith, said armature axially spaced from said radially extending wall of said rotor;
a first clutch plate disposed axially between said radially extending wall of said rotor and said armature, said first clutch plate coupled to said hub for rotation therewith, but axially movable relative to said hub;
a second clutch plate disposed axially between said radially extending wall of said rotor and said armature, said second clutch plate coupled to said rotor for rotation therewith, but axially movable relative to said rotor; and,
a field shell disposed about said hub and said axis of rotation on an opposite side of said radially extending wall of said rotor from said armature, said field shell housing a conductor therein;
wherein said armature and said first and second clutch plates are configured for movement in a first axial direction towards said radially extending wall of said rotor upon energization of said conductor to thereby cause frictional engagement of said first and second clutch plates and coupling of said rotor to said hub for rotation therewith and are configured for movement in a second axial direction opposite said first axial direction upon subsequent deenergization of said conductor, at least one of said hub and said rotor including first means for limiting movement of a corresponding one of said first and second clutch plates in said second axial direction wherein said at least one of said hub and said rotor comprises said hub.

10. The rotational coupling device of claim 9, wherein another of said hub and said rotor includes second means for limiting movement of another of said first and second clutch plates in said second axial direction.

11. A rotational coupling device, comprising:
a hub configured for coupling to a shaft for rotation with said shaft about an axis of rotation;
a rotor supported on said hub and configured for rotation relative to said hub about said axis of rotation, said rotor defining a radially extending wall;
an armature supported on said hub for rotation therewith, said armature axially spaced from said radially extending wall of said rotor;
a first clutch plate disposed axially between said radially extending wall of said rotor and said armature, said first clutch plate coupled to said hub for rotation therewith, but axially movable relative to said hub;
a second clutch plate disposed axially between said radially extending wall of said rotor and said armature, said second clutch plate coupled to said rotor for rotation therewith, but axially movable relative to said rotor; and,
a field shell disposed about said hub and said axis of rotation on an opposite side of said radially extending wall of said rotor from said armature, said field shell housing a conductor therein;
wherein said armature and said first and second clutch plates are configured for movement in a first axial direction towards said radially extending wall of said rotor upon energization of said conductor to thereby cause frictional engagement of said first and second clutch plates and coupling of said rotor to said hub for rotation therewith and are configured for movement in a second axial direction opposite said first axial direction upon subsequent deenergization of said conductor, at least one of said hub and said rotor including first means for limiting movement of a corresponding one of said first and second clutch plates in said second axial direction
a third clutch plate disposed axially between said radially extending wall of said rotor and said armature, said third clutch plate coupled to said hub for rotation therewith, but axially movable relative to said hub; and,
a fourth clutch plate disposed axially between said radially extending wall of said rotor and said armature, said fourth clutch plate coupled to said rotor for rotation therewith, but axially movable relative to said rotor;
wherein said third and fourth clutch plates are configured for movement in said first axial direction towards said radially extending wall of said rotor upon energization of said conductor and are configured for movement in said second axial direction upon subsequent deenergization of said conductor, said at least one of said hub and said rotor defining second means for limiting movement of a corresponding one of said third and fourth clutch plates in said second axial direction.

12. The rotational coupling device of claim 11, wherein a radial distance from said axis of rotation to said first limiting means is different from a radial distance from said axis of rotation to said second limiting means.

13. The rotational coupling device of claim 11, wherein another of said hub and said rotor defines a third means for limiting movement of another of said first and second clutch plates in said second axial direction and a fourth means for limiting movement of another of said third and fourth clutch plates in said second axial direction.

14. The rotational coupling device of claim 13, wherein a radial distance from said axis of rotation to said third limiting means is different from a radial distance from said axis of rotation to said fourth limiting means.

15. A rotational coupling device, comprising:
a hub configured for coupling to a shaft for rotation with said shaft about an axis of rotation;
a rotor supported on said hub and configured for rotation relative to said hub about said axis of rotation, said rotor defining a radially extending wall;
an armature supported on said hub for rotation therewith, said armature axially spaced from said radially extending wall of said rotor;
a first clutch plate disposed axially between said radially extending wall of said rotor and said armature, said first clutch plate coupled to said hub for rotation therewith, but axially movable relative to said hub;
a second clutch plate disposed axially between said radially extending wall of said rotor and said armature, said second clutch plate coupled to said rotor for rotation therewith, but axially movable relative to said rotor; and,
a field shell disposed about said hub and said axis of rotation on an opposite side of said radially extending wall of said rotor from said armature, said field shell housing a conductor therein;
wherein said armature and said first and second clutch plates are configured for movement in a first axial direction towards said radially extending wall of said rotor upon energization of said conductor to thereby cause frictional engagement of said first and second clutch plates and coupling of said rotor to said hub for rotation therewith and are configured for movement in a second axial direction opposite said first axial direction upon subsequent deenergization of said conductor, at least one of said hub and said rotor including first means for limiting movement of a corresponding one of said first and second clutch plates in said second axial direction
a spring biasing said armature in said first axial direction, said spring configured to counteract an opposing force biasing said armature in said second axial direction.

16. The rotational coupling device of claim 15, wherein said spring provides a biasing force that is equal to said opposing force.

17. A rotational coupling device, comprising:
a hub configured for coupling to a shaft for rotation with said shaft about an axis of rotation;
a rotor supported on said hub and configured for rotation relative to said hub about said axis of rotation, said rotor defining a radially extending wall;
an armature supported on said hub for rotation therewith, said armature axially spaced from said radially extending wall of said rotor;
a first clutch plate disposed axially between said radially extending wall of said rotor and said armature, said first clutch plate coupled to said hub for rotation therewith, but axially movable relative to said hub;
a second clutch plate disposed axially between said radially extending wall of said rotor and said armature, said second clutch plate coupled to said rotor for rotation therewith, but axially movable relative to said rotor;
a third clutch plate disposed axially between said radially extending wall of said rotor and said armature, said third clutch plate coupled to one of said hub and said rotor for rotation therewith, but axially movable relative to said one of said hub and said rotor; and, a field shell disposed about said hub on an opposite side of said radially extending wall of said rotor from said armature, said field shell housing a conductor therein;

wherein said armature and said first, second and third clutch plates are configured for movement in a first axial direction towards said radially extending wall of said rotor upon energization of said conductor to thereby cause frictional engagement of said first, second, and third clutch plates and coupling of said rotor to said hub for rotation therewith and are configured for movement in a second axial direction opposite said first axial direction upon subsequent deenergization of said conductor, said one of said hub and said rotor defining a first shoulder disposed between said third clutch plate and a corresponding one of said first and second clutch plates, said first shoulder configured to limit movement of said corresponding one of said first and second clutch plates in said second axial direction and not opposing movement of said corresponding one of said first and second clutch plates and said third clutch plate in said first axial direction.

18. The rotational coupling device of claim 17 wherein said one of said hub and said rotor comprises said hub.

19. The rotational coupling device of claim 18 wherein said one of said hub and said rotor comprises said rotor.

20. The rotational coupling device of claim 18, further comprising a spring biasing said armature in said first axial direction, said spring configured to counteract an opposing force biasing said armature in said second axial direction.

\* \* \* \* \*